(12) United States Patent
Keser et al.

(10) Patent No.: US 9,234,636 B2
(45) Date of Patent: Jan. 12, 2016

(54) LIGHT GUIDE

(75) Inventors: Merijn Keser, Eindhoven (NL); Marco Andreas Jacobus Van As, Waalre (NL); Frank Walterus Franciscus Marie Van Kempen, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 64 days.

(21) Appl. No.: 14/129,383

(22) PCT Filed: Jun. 29, 2012

(86) PCT No.: PCT/IB2012/053314
§ 371 (c)(1),
(2), (4) Date: Dec. 26, 2013

(87) PCT Pub. No.: WO2013/005147
PCT Pub. Date: Jan. 10, 2013

(65) Prior Publication Data
US 2014/0126234 A1 May 8, 2014

(30) Foreign Application Priority Data

Jul. 1, 2011 (EP) .................................... 11172403

(51) Int. Cl.
*F21V 5/04* (2006.01)
*F21K 99/00* (2010.01)
(Continued)

(52) U.S. Cl.
CPC ... *F21K 9/52* (2013.01); *F21V 5/04* (2013.01); *F21V 7/0091* (2013.01); *G02B 6/0008* (2013.01); *G02B 19/0028* (2013.01); *G02B 19/0061* (2013.01); *G02B 19/0066* (2013.01); *F21K 9/00* (2013.01)

(58) Field of Classification Search
CPC ......... F21V 7/041; F21V 7/0025; F21V 5/04; F21V 7/0091; F21V 2008/00; F21V 2008/002; F21V 2008/005; F21K 9/52; F21K 9/00; G02B 19/0061; G02B 6/0008; G02B 19/0028; G02B 19/0066; G02B 6/00; G02B 6/0001
See application file for complete search history.

(56) References Cited

U.S. PATENT DOCUMENTS 6,177,761 B1    1/2001  Pelka et al.
6,350,041 B1 *  2/2002  Tarsa et al. ..................... 362/231
(Continued)

FOREIGN PATENT DOCUMENTS

CN    201715326 U    1/2011
GB       2372091    *  8/2002    ................ F21V 8/00
(Continued)

*Primary Examiner* — Bao Q Truong
(74) *Attorney, Agent, or Firm* — Meenakshy Chakravorty

(57) ABSTRACT

The disclosed embodiments relate to a light guide (100) and a luminaire (700) including such a light guide (100). The light guide (100) guides light emitted in a first direction (500) from a light source (200) comprising at least one light emitting diode (210). The light guide (100) directs a major part of the light in a second direction (600), wherein the first direction (500) is not equal to the second direction (600). The light guide (100) comprises an upper part (110) having a shape of a cone, and a center axis (120) of the upper part (110) is in the first direction (500). The light guide (100) can be used with reflectors (800) that have originally been manufactured for use with high intensity discharge lamps or halogen lamps but because of the light guide (100), the reflectors (800) can be used together with light sources (200) in the form of at least one light emitting diode (210).

12 Claims, 4 Drawing Sheets

(51) Int. Cl.
*F21V 7/00* (2006.01)
*F21V 8/00* (2006.01)
*G02B 19/00* (2006.01)

(56) References Cited

U.S. PATENT DOCUMENTS

| | | |
|---|---|---|
| 6,558,032 B2 | 5/2003 | Kondo |
| 6,951,415 B2 | 10/2005 | Amanoo |
| 2004/0120157 A1 | 6/2004 | Bottesch |
| 2007/0102721 A1 | 5/2007 | DenBaars |
| 2008/0123349 A1 | 5/2008 | Chaves et al. |
| 2008/0198603 A1 | 8/2008 | Sormani et al. |
| 2008/0278961 A1 | 11/2008 | Cunnien |

FOREIGN PATENT DOCUMENTS

| | | |
|---|---|---|
| GB | 2372091 A | 8/2002 |
| GB | 2464919 A | 5/2010 |
| JP | 2000315046 A | 11/2000 |
| WO | 2010044030 A1 | 4/2010 |

* cited by examiner

LIGHT GUIDE

FIELD OF THE INVENTION

The present invention relates to the field of light sources, and more specifically to a light guide and a luminaire including such a light guide.

BACKGROUND OF THE INVENTION

LEDs (Light Emitting Diodes) or modules comprising LEDs, generate light in the form of a half sphere instead of the omnidirectional light pattern emitted by other present art light sources like HID (High Intensity Discharge) lamps and halogen lamps. A LED light source is also often located at the bottom of a reflector. This makes it necessary to develop reflectors designed specifically for such LED light sources which can be cost and capacity demanding. Furthermore, standard LED light source applications often suffer from glare.

SUMMARY OF THE INVENTION

It is an object of the present invention to overcome or alleviate problems of the prior art.

According to a first aspect of the invention, this and other objects are achieved by a light guide for guiding light emitted in a first direction from a light source comprising at least one light emitting diode, wherein the light guide is arranged to direct a major part of the light in a second direction, wherein the first direction is not equal to the second direction, wherein the light guide comprises an upper part having a shape of a cone or an elliptic paraboloid, and wherein a center axis of the upper part is in the first direction. This is advantageous in that glare is limited since a major part of the light leaves the upper part in the second direction and thus less light comes directly from the light source. Furthermore, because the light travels through the light guide, the light will be mixed to some extent, enabling a more homogeneous beam pattern.

The light guide may be arranged to direct a minor part of the light in the first direction. This is advantageous in that there is less loss due to reflection.

The light guide may be arranged to provide total internal reflection. This is advantageous in that there is less loss due to reflection.

The light emitted from the light source may be arranged to enter the light guide through a base of the upper part.

A major part of the light may be arranged to exit the light guide through a circumferential surface of the upper part.

The light may be arranged to, prior to exiting the light guide through the circumferential surface of the upper part, be reflected on an opposite part of the circumferential surface of the upper part such that after the reflection, the light is directed in the second direction.

A minor part of the light may be arranged to exit the light guide through a top part of the upper part. This is advantageous in that there is less loss due to multiple reflection.

The light guide may comprise a cylinder part having a shape of a cylinder and wherein the light emitted from the light source is arranged to enter the light guide through a base of the cylinder part and continue through the base of the upper part. This is advantageous in that the height of the light emitted in the second direction can be adjusted by adjusting the height of the cylinder part.

The cylinder part may be arranged to provide total internal reflection. This is advantageous in that there is less loss due to reflection and in that the light only leaves the light guide at the predefined area (through the upper part).

The circumferential surface may be at least one from the group of segmented and facetted. This is advantageous in that the distribution of the light can be made more uniform in terms of brightness.

The cylinder part may be at least one from the group of segmented and facetted. This is advantageous in that the distribution of the light can be made more uniform in terms of brightness.

According to a second aspect of the invention, this and other objects are achieved by a luminaire. The luminaire comprises: a light guide according to anyone of the embodiments under the first aspect.

The luminaire may further comprise a light source comprising at least one light emitting diode (LED). This is advantageous in that it is capacity and cost efficient. Alternatively, the luminaire may comprise a LED lighting module comprising at least one light emitting diode or an array of light emitting diodes. An example of such a LED lighting module are the LED lighting modules being standardized within the standardizing consortium Zhaga.

The light source may optionally also comprise at least one of a mix box and a diffusive exit window. This is advantageous in that properties of the light emitted from the light source can be adjusted.

The luminaire may further comprise a reflector wherein the reflector is adapted for a light source selected from the group of high intensity discharge lamps and halogen lamps. This is advantageous in that the light guide may be used with reflectors that are adapted for light sources selected from the group of high intensity discharge lamps and halogen lamps which is both capacity and cost efficient. Moreover, it generates new luminaire design possibilities, as such a reflector has a different form factor compared to standard reflectors for LED lighting products.

The advantages of the first aspect are equally applicable to the second aspect. Furthermore, the second aspect can be embodied in accordance with the first aspect.

It is noted that the invention relates to all possible combinations of features recited in the claims.

BRIEF DESCRIPTION OF THE DRAWINGS

This and other aspects of the present invention will now be described in more detail, with reference to the appended drawings showing embodiments of the invention in which.

DETAILED DESCRIPTION

Figure 1:
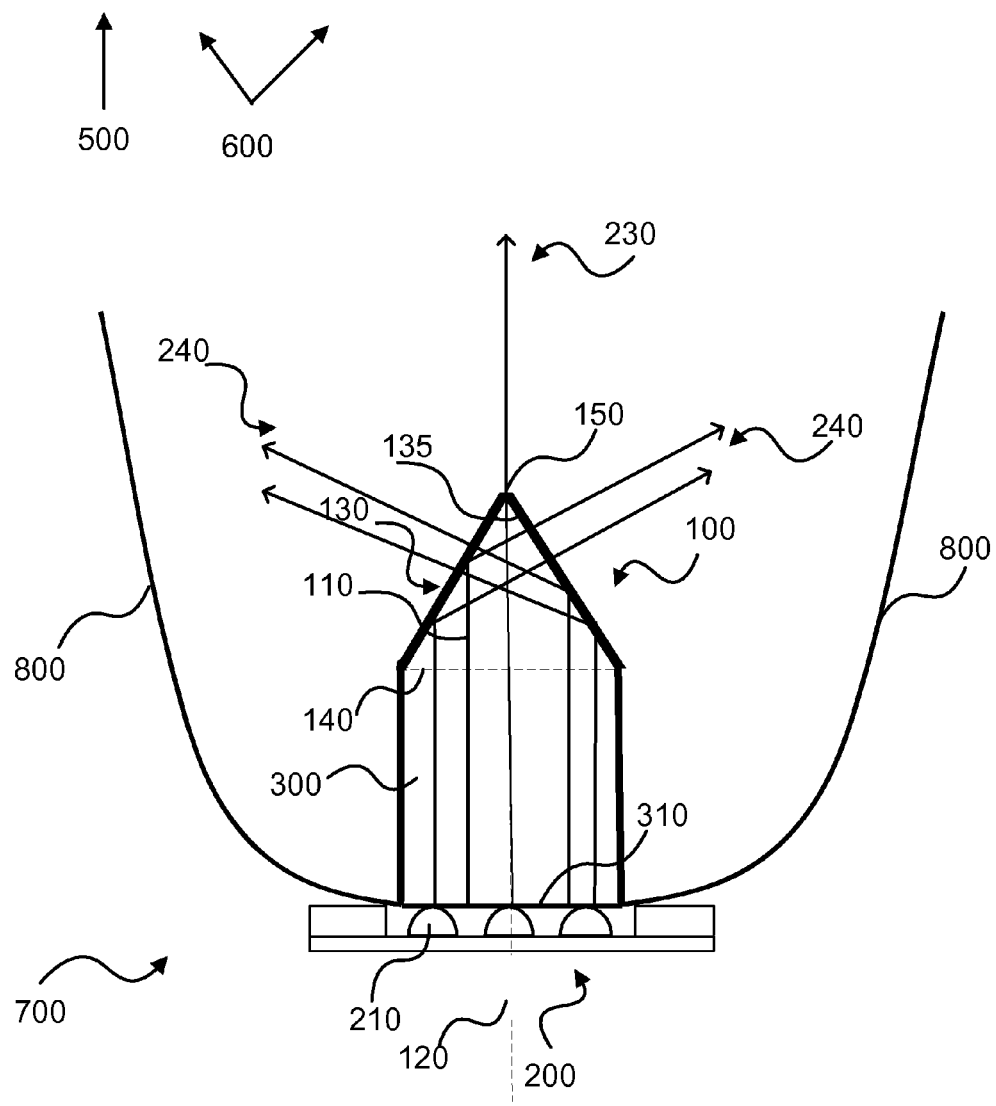
FIG. 1 is a schematic illustration of a cross-section of an embodiment of the inventive light guide arranged in an embodiment of the inventive luminaire.

FIG. 1 is a schematic illustration of a cross-section of an embodiment of the inventive light guide arranged in an embodiment of the inventive luminaire.

The luminaire 700 comprises a light guide 100, a light source 200 and a reflector 800. The reflector 800 may be adapted for a light source selected from the group of high intensity discharge lamps and halogen lamps. Thus, the reflector 800 may originally be manufactured for use with high intensity discharge lamps or halogen lamps but because of the light guide 100, the reflector 800 can be used together with a light source 200 in the form of at least one light emitting diode 210.

Figure 2:
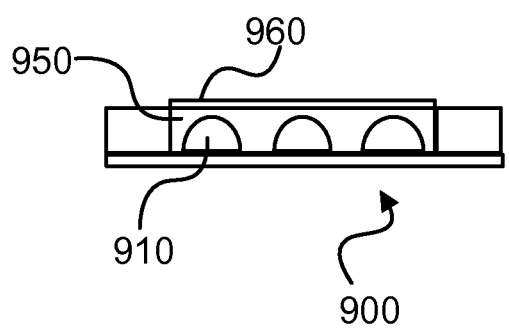
FIG. 2 is a schematic illustration of a cross-section of an embodiment of a light source to be used in the inventive luminaire.

The light source 200 may comprise a light emitting diode module comprising the at least one light emitting diode 210. FIG. 2 is a schematic illustration of a cross-section of an embodiment of a light source to be used in the inventive luminaire. The light source 900 may comprise a light emitting diode module comprising the at least one light emitting diode 910. A diffusive window 960 is arranged in the light source 900 such that light emitted from the at least one light emitting diode 910 travels through the diffusive window 960. The diffusive window 960 is arranged to spread the light that travels through it which results in more uniform brightness of the light emitted from the light source 900. The light source 900 may also comprise a mix box 950 arranged to mix the light emitted from the light source 900. A mix box is a space surrounded by reflective walls, in which light is reflected multiple times. Due to the multiple reflections, the light can be seen as to originate from any point within this space, thus creating the effect of a single (larger) light source, instead of multiple (small) light sources. The diffusive window 960 may be arranged in front of the mix box 950 and be covered by a diffusive cover.

The light guide 100 of FIG. 1 has a upper part 110 having a shape of a cone and a cylinder part 300 in the shape of a cylinder. It is to be noted that the light guide can equally be embodied without a cylinder part 300.

Preferably, both the upper part 110 and the cylinder part 300 provide total internal reflection. Total internal reflection is to be interpreted as that light reflected internally in the upper part 110 and the cylinder part 300 is reflected solely due to difference in refractive index between the light guide and the surrounding air, resulting in reflection without loss.

The height at which the light from the light source 200, 900 reaches the reflector 800 is determined by the height of the light guide 100. The height of the light guide 100 is easily varied by varying the height of the cylinder part 300.

The angle at which the light is emitted from the light guide 100 is determined by the top angle 135 of the upper part 110.

Light from the light source 200, 900 is emitted in a semi-spherical distribution, which is oriented in a first direction 500. A center axis 120 of the upper part 110 is in the first direction 500. The light guide 100 is arranged to direct a major part of the light 240 in a second direction 600, wherein the first direction 500 is not equal to the second direction 600. It is to be noted that the second direction 600 is herein to be interpreted broadly. The second direction 600 can be any direction that is not parallel to the first direction 500.

The light guide 100 can be arranged to direct a minor part of the light 230 in the first direction 500. Light from the light source 200, 900, that is directed in the first direction 500 and close to the center axis 120 of the upper part, travels through the light guide 100 and exits the light guide 100 through a top part 150 of the upper part 110. This light is referred to as the minor part of the light 230. The top part 150 of the upper part 110 can be flat so that light travelling in the first direction 500 is incident on the top part 150 at a perpendicular angle.

The upper part 110 has a circumferential surface 130. A major part of the light 240 is arranged to exit the light guide 100 through the circumferential surface 130 of the upper part 100.

The light emitted from the light source 200, 900 enters the light guide 100 through a base 140 of the upper part 110. More particularly, the light emitted from the light source 200, 900 enters the light guide 100 through a base 310 of the cylinder part 300 and continues through the base 140 of the upper part 110.

Prior to exiting the light guide 100 through the circumferential surface 130 of the upper part 110, a major part of the light 240 is arranged to be reflected on an opposite part of the circumferential surface 130 of the upper part 110 such that after the reflection, the light is directed in the second direction 600. An example of this is illustrated in FIG. 1. Light 240 leaves the light source 200 and is incident on an inside of the circumferential surface 130. Since the light 240 is incident at a large angle in relation to the surface normal, the light 240 is reflected. The reflected light travels through the light guide 100 and is incident on an opposite part of the inside of the circumferential surface 130. Here, the light is incident on the inside of the circumferential surface 130 close to parallel with the surface normal and is thus not reflected. Instead, the light exits the light guide 100 and continues towards the reflector 800 or, depending on the direction of the light, continues out and away from the luminaire 700. The larger the angle of incidence in relation to the surface normal, the more light is reflected.

Figure 3:
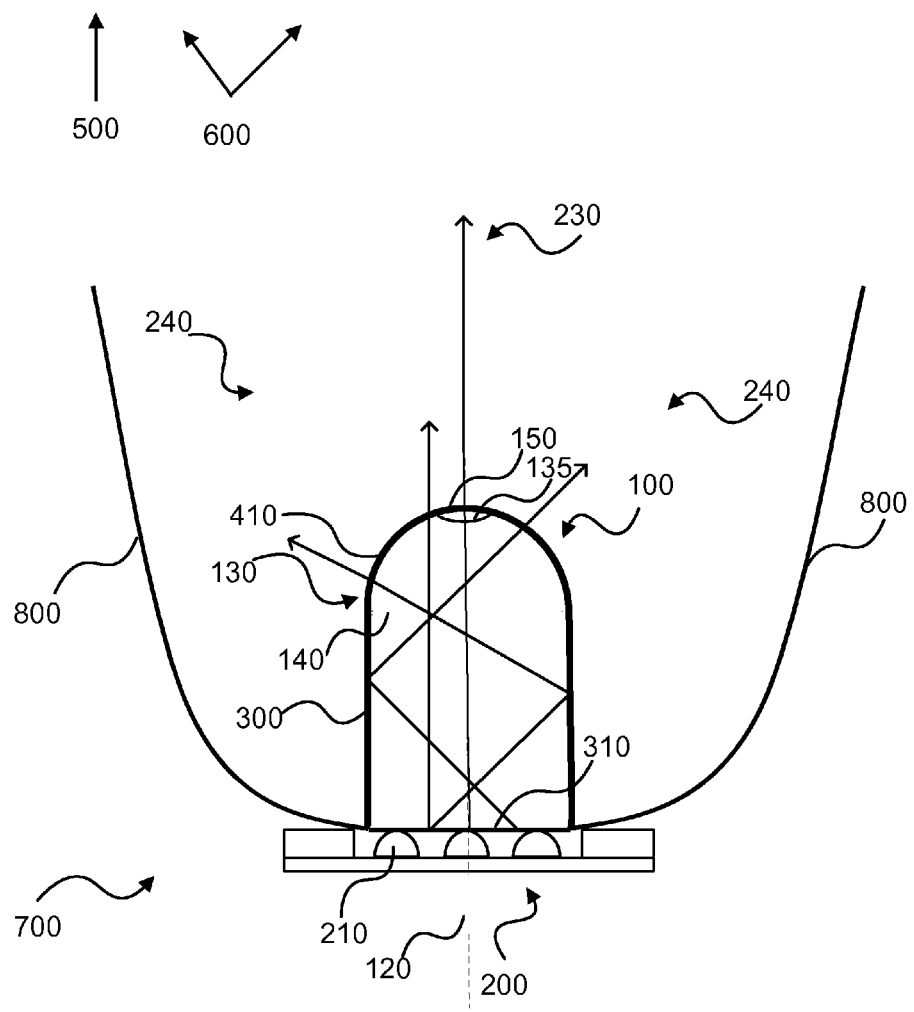
FIG. 3 is a schematic illustration of a cross-section of an embodiment of the inventive light guide arranged in an embodiment of the inventive luminaire.

FIG. 3 is a schematic illustration of a cross-section of an embodiment of the inventive light guide arranged in an embodiment of the inventive luminaire. FIG. 3 is equivalent to FIG. 1 except for the shape of the upper part. Instead of having a shape of a cone, the upper part (410) has a shape of a paraboloid.

Figure 4:
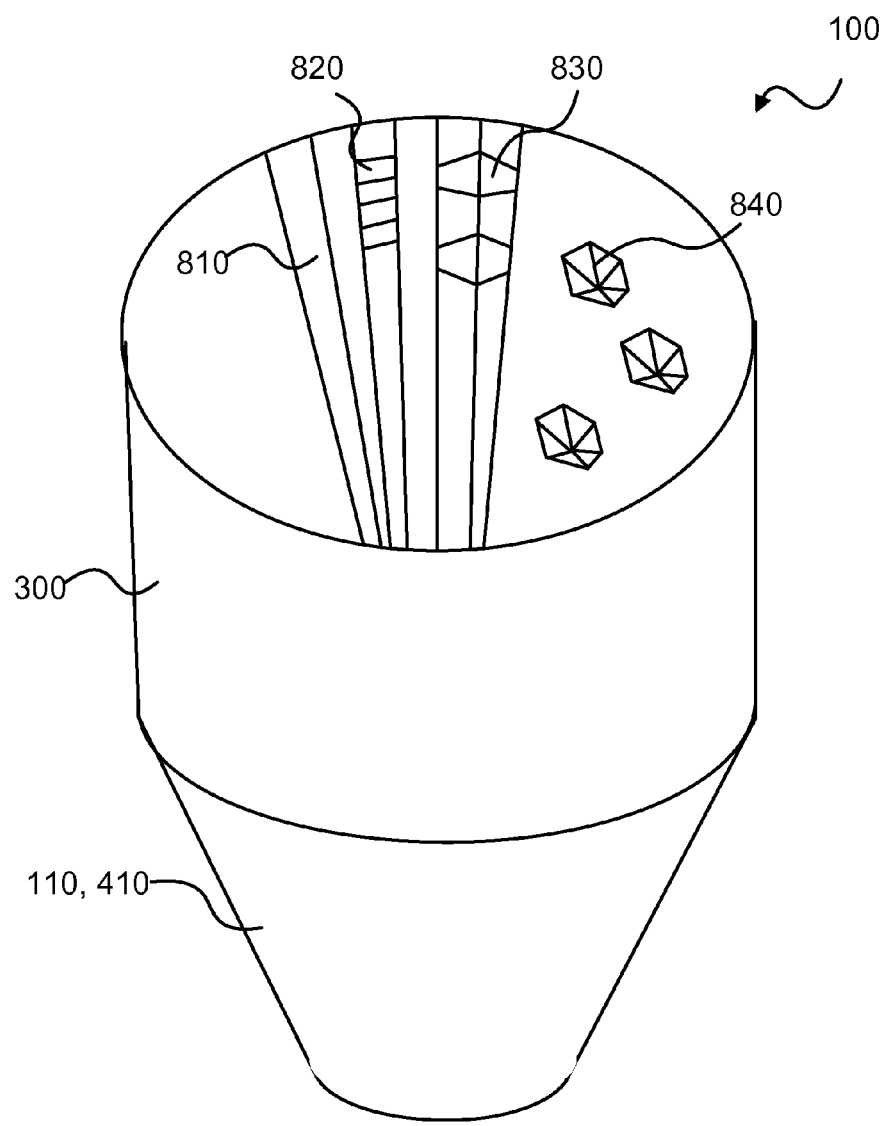
FIG. 4 is a schematic illustration of a perspective view of an embodiment of the inventive light guide rotated 180° in view of the embodiments of the light in FIGS. 1 and 3.

FIG. 4 is a schematic illustration of a perspective view of an embodiment of the inventive light guide rotated 180° in view of the embodiments of the light in FIGS. 1 and 3.

The cylinder part 300 and the upper part 110, 410 may be at least one from facetted and segmented. To exemplify, a few different alternatives are disclosed in FIG. 4. For example, the cylinder part 300 and/or the upper part 410 may be segmented as is illustrated by segment 810. Alternatively, the segments 810 may be divided into smaller segments 820. As an alternative, the segments 810 may be divided in facets 830. As a further alternative, the cylinder part 300 and/or the upper part 410 may comprise facets 840. It is to be noted that all sorts of combinations are possible.

In summary, the disclosed embodiments relate to a light guide 100 and a luminaire 700 including such a light guide 100. The light guide 100 guides light emitted in a first direction 500 from a light source 200 comprising at least one light emitting diode 210. The light guide 200 directs a major part of the light in a second direction 600, wherein the first direction 500 is not equal to the second direction 600. The light guide 100 comprises a upper part 110 having a shape of a cone, and a center axis 120 of the upper part 110 is in the first direction 500. The light guide 100 can be used with reflectors 800 that have originally been manufactured for use with high intensity discharge lamps or halogen lamps but because of the light guide 100, the reflectors 800 can be used together with light sources 200 in the form of at least one light emitting diode 210.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A luminaire, comprising:
    a light source comprising at least one light emitting diode and a mix box, and
    a light guide for guiding light emitted in a first direction from the light source,
    wherein the light guide is arranged to direct a major part of the light in a second direction,
    wherein the first direction is not equal to the second direction,
    wherein the light guide comprises an upper part, wherein a center axis of the upper part is substantially aligned with the first direction,
    wherein the upper part has a circumferential surface and has a shape of a cone or an elliptic paraboloid,
    wherein the light guide further comprises a cylinder part having a shape of a cylinder and wherein the light emitted from the light source is arranged to enter the light guide through a base of the cylinder part and continue through the base of the upper part.

2. The luminaire according to claim 1, wherein the light guide is arranged to direct a minor part of the light in the first direction.

3. The luminaire according to claim 2, wherein the light guide is arranged to provide total internal reflection.

4. The luminaire according to claim 3, wherein the light emitted from the light source is arranged to enter the light guide through a base of the upper part.

5. The luminaire according to claim 4, wherein a major part of the light is arranged to exit the light guide through the circumferential surface of the upper part.

6. The luminaire according to claim 5, wherein the light is arranged to, prior to exiting the light guide through the circumferential surface of the upper part, be reflected on an opposite part of the circumferential surface of the upper part such that after the reflection, the light is directed in the second direction.

7. The luminaire according to claim 1, wherein a minor part of the light is arranged to exit the light guide through a top part of the upper part.

8. The luminaire according to claim 1, wherein the cylinder part is arranged to provide total internal reflection.

9. The luminaire according to claim 1, wherein the circumferential surface is segmented and/or facetted.

10. The luminaire according to claim 9, wherein the cylinder part is at least one from the group of segmented and facetted.

11. A luminaire, comprising:
    a light source comprising at least one light emitting diode and a mix box, wherein the light source further comprises a diffusive exit window, and
    a light guide for guiding light emitted in a first direction from the light source,
    wherein the light guide is arranged to direct a major part of the light in a second direction,
    wherein the first direction is not equal to the second direction,
    wherein the light guide comprises an upper part, wherein a center axis of the upper part is substantially aligned with the first direction,
    wherein the upper part has a circumferential surface and has a shape of a cone or an elliptic paraboloid.

12. The luminaire according to claim 11, further comprising a reflector configured for a light source selected from the group consisting of: high intensity discharge lamps and halogen lamps.

* * * * *